United States Patent
Klem

(10) Patent No.: US 6,347,618 B1
(45) Date of Patent: Feb. 19, 2002

(54) INTERCOOLER SYSTEM FOR INTERNAL COMBUSTION ENGINE

(75) Inventor: Richard H. Klem, Richmond, VA (US)

(73) Assignee: Klem Flying Boats, L.P., Richmond, VA (US)

(*) Notice: Subject to any disclaimer, the term of this patent is extended or adjusted under 35 U.S.C. 154(b) by 0 days.

(21) Appl. No.: 09/628,349

(22) Filed: Jul. 28, 2000

Related U.S. Application Data

(60) Provisional application No. 60/146,159, filed on Jul. 30, 1999.

(51) Int. Cl.[7] .................................................. F02B 29/04
(52) U.S. Cl. ........................ 123/561; 123/562; 123/563
(58) Field of Search ................................. 123/561, 562, 123/563; 60/599, 612

(56) References Cited

U.S. PATENT DOCUMENTS

| | | | | |
|---|---|---|---|---|
| 2,935,978 A | * | 5/1960 | Kelgard et al. | 123/563 |
| 3,257,797 A | * | 6/1966 | Lieberherr | 60/599 |
| 4,480,439 A | * | 11/1984 | Yamane | 60/599 |
| 4,683,725 A | * | 8/1987 | Sugiura | 123/563 |
| 5,361,744 A | * | 11/1994 | Teraoka | 123/561 |

FOREIGN PATENT DOCUMENTS

| | | | | |
|---|---|---|---|---|
| JP | 63-167027 | * | 7/1988 | 123/561 |
| JP | 5-340260 | * | 12/1993 | 123/562 |

* cited by examiner

*Primary Examiner*—Michael Koczo
(74) *Attorney, Agent, or Firm*—Richard E. Kurtz; Greenberg Traurig

(57) ABSTRACT

Disclosed is an intercooler system which uses an air conditioner evaporator coil or other mechanical refrigeration device to cool air flowing therethrough prior to intake of the air by an internal combustion engine. The invention thereby reduces the temperature of the air entering the engine well beyond the temperature reduction provided by a conventional intercooler. The invention may be used to chill the air to a point cooler than ambient temperature or even down to below freezing. In some embodiments, a conventional intercooler may be used to partially cool the air before it enters the intercooler of the invention. In other embodiments, the intercooler may be used in combination with a novel engine-driven supercharger having a variable-speed drive. The engine-driven supercharger of the invention may alternatively be used independently of the disclosed intercooler.

23 Claims, 3 Drawing Sheets

INTERCOOLER SYSTEM FOR INTERNAL COMBUSTION ENGINE

This application claims the benefit of U.S. Provisional Patent Application No. 60/146,159, filed Jul. 30, 1999, the entire disclosure of which is incorporated herein by reference.

BACKGROUND OF THE INVENTION

1. Field of the Invention

The invention relates in general to intercoolers for internal combustion engines, and in particular to novel means for providing improved cooling of air flowing through such an intercooler prior to intake by an internal combustion engine.

2. Related Art

Intercoolers are known in the art for cooling air before it enters a supercharged engine. The effect of cooling the air is to prevent pre-ignition or knocking and to make it possible to utilize higher boost pressure and higher compression. Intercoolers are so-named because they are placed in-between the supercharger and the engine.

Conventional intercoolers utilize air or water as the cooling medium. In water-cooled intercoolers, it is known to cool the water with ice. However, even such cooling of the cooling medium is insufficient; because the supercharger raises the temperature of the air dramatically, the air entering the engine is typically still significantly warmer than the ambient temperature.

OBJECTS AND SUMMARY OF THE INVENTION

It is therefore an object of the invention to provide an improved intercooler for an internal combustion engine.

It is a further object of the invention to provide an intercooler which is capable of cooling engine intake air to a lower temperature than those of the prior art.

It is yet a further object of the invention to provide an intercooler which permits higher boost pressures.

It is yet a further object of the invention to provide an intercooler which permits higher engine compression ratios.

In a preferred embodiment, the invention provides an intercooler system which uses an air conditioner evaporator coil or other mechanical refrigeration device to cool air flowing therethrough prior to intake of the air by an internal combustion engine. The invention thereby reduces the temperature of the air entering the engine well beyond the temperature reduction provided by a conventional intercooler. The invention may be used to chill the air to a point cooler than ambient temperature or even down to below freezing. In some embodiments, a conventional intercooler may be used to partially cool the air before it enters the intercooler of the invention. In other embodiments, the intercooler may be used in combination with a novel engine-driven supercharger having a variable-speed drive. The engine-driven supercharger of the invention may alternatively be used independently of the disclosed intercooler.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
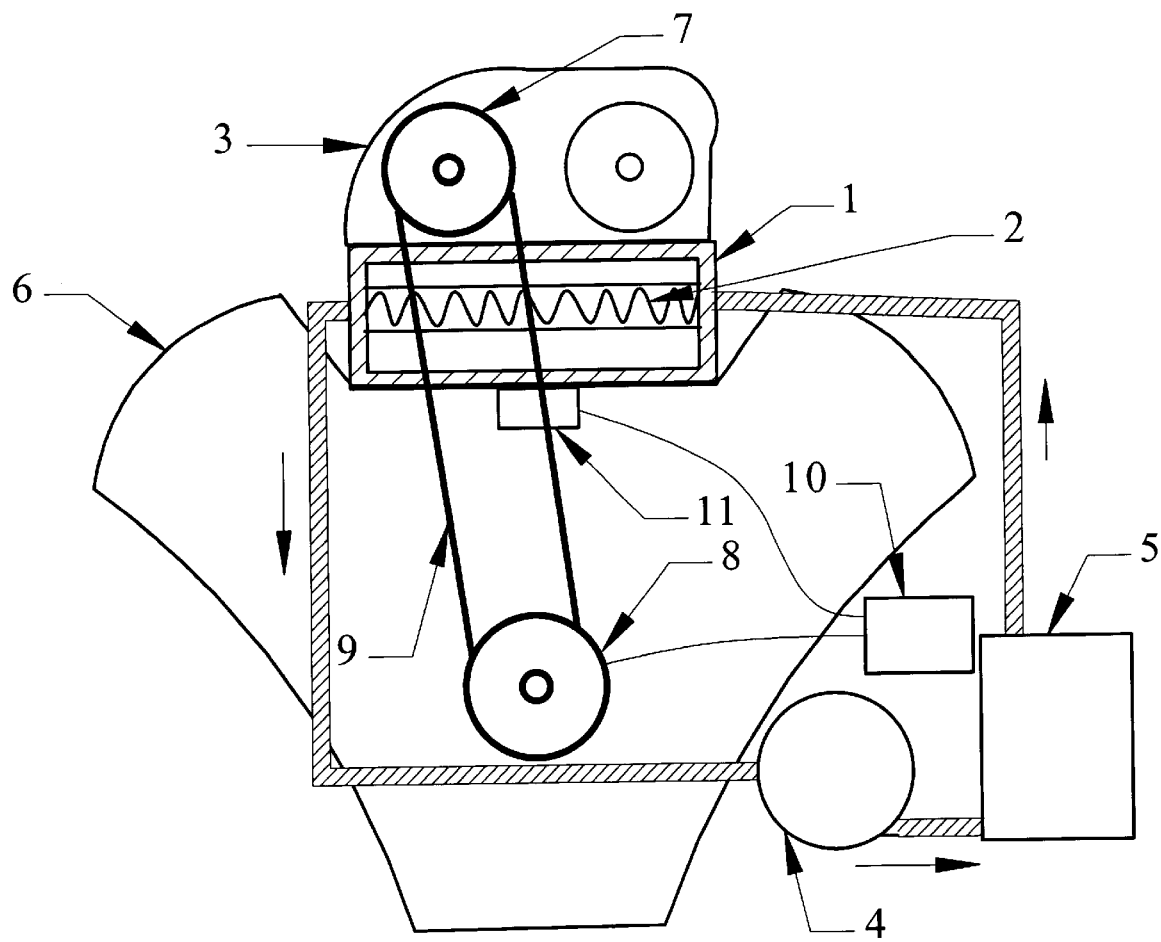
FIG. 1 shows a front elevational view illustrating the intercooler system and supercharger in accordance with preferred embodiments of the invention.

With reference to FIG. 1, a supercharged engine 6 receives intake air from a supercharger 3 via an intermediate intercooler case 1 interposed between the supercharger 3 and the air intake of the engine 6. The intercooler case 1 includes an evaporator coil or coils 2 which cool compressed air flowing through the intercooler prior to entry of the air into the air intake of the engine 6. The evaporator coil 2 receives compressed coolant from a compressor 4 and a condenser 5 using a closed-loop cooling system design. Various alternative designs for this system may be used, including variations upon well-known evaporator/compressor/condenser designs used in the air-conditioning and refrigeration fields. In an alternative embodiment, a conventional intercooler may be used to partially cool the intake air before it enters the intercooler of the invention as described above.

The invention may be used to chill the air to a point cooler than ambient temperature or even down to below freezing. The cooling effect is further enhanced by the condensation that will generally form on an evaporator coil. Evaporation of this water inside the engine absorbs energy and further reduces temperatures inside the engine. Points 25 and other means may be provided for distributing the condensation substantially equally among cylinders.

The greatly reduced temperature makes it possible for the engine to withstand extremely high boost pressures and yet have a higher compression ratio than a conventional non-supercharged engine. This has substantial benefits for performance, but also can improve mileage especially if a smaller engine is used. The invention thus makes it possible to have both better fuel efficiency and better performance.

The invention is preferably used in a car, truck, aircraft or boat that is often operated at less than maximum output. With such a duty cycle, an engine utilizing this invention would often operate as a small, low-performance/high-fuel efficiency unit. Only when more performance is called for would the greater power potential come into play.

A fully optimized engine utilizing the invention may have sufficient boost to produce two to three times as much power as it would with no boost.

In one embodiment, a novel engine-driven supercharger is used, though the invention would also be effective with any type of engine-driven or turbo driven supercharger or even on a non-supercharged engine. The novel engine-driven supercharger, which also could be used independently of the intercooler invention, features a variable speed drive.

The variable-speed drive in accordance with the invention may comprise, e.g., a variable pulley system, transmission, or gearbox. As shown in FIG. 1, the variable-speed drive in its preferred embodiment comprises a variable-radius driven pulley 7, a variable radius drive pulley 8, and a blower belt 9. The variable-radius driven pulley 7 drives the blower of the supercharger 3 and is driven by the variable radius drive pulley 8 via the blower belt 9. The effective radius of the pulleys 7 and/or 8 may be varied, thereby changing the drive ratio between the supercharger 3 and the engine 6. In one embodiment, the driven pulley 7 is of the centrifugal type wherein centrifugal force acting on weights continuously adjusts the radius of the pulley. The ability to vary the ratio between the supercharger's rpm and the engine's rpm has two primary advantages: low speed torque can be increased and boost and can be reduced when it is not needed thereby improving fuel efficiency.

The variable-speed drive may be connected to an engine management computer (EMC) 10 to give several modes of operation. In a performance mode the boost could be maximized right up to the point a knock sensor 11 detects knock. In an economy mode the boost could be minimized. In other modes the computer could try to predict how much boost was desired. When used with a displacement type supercharger, e.g. a Roots type, the variable ratio could be used to reduce pumping losses at lower power outputs by acting as a substitute for a throttle.

Figure 2:
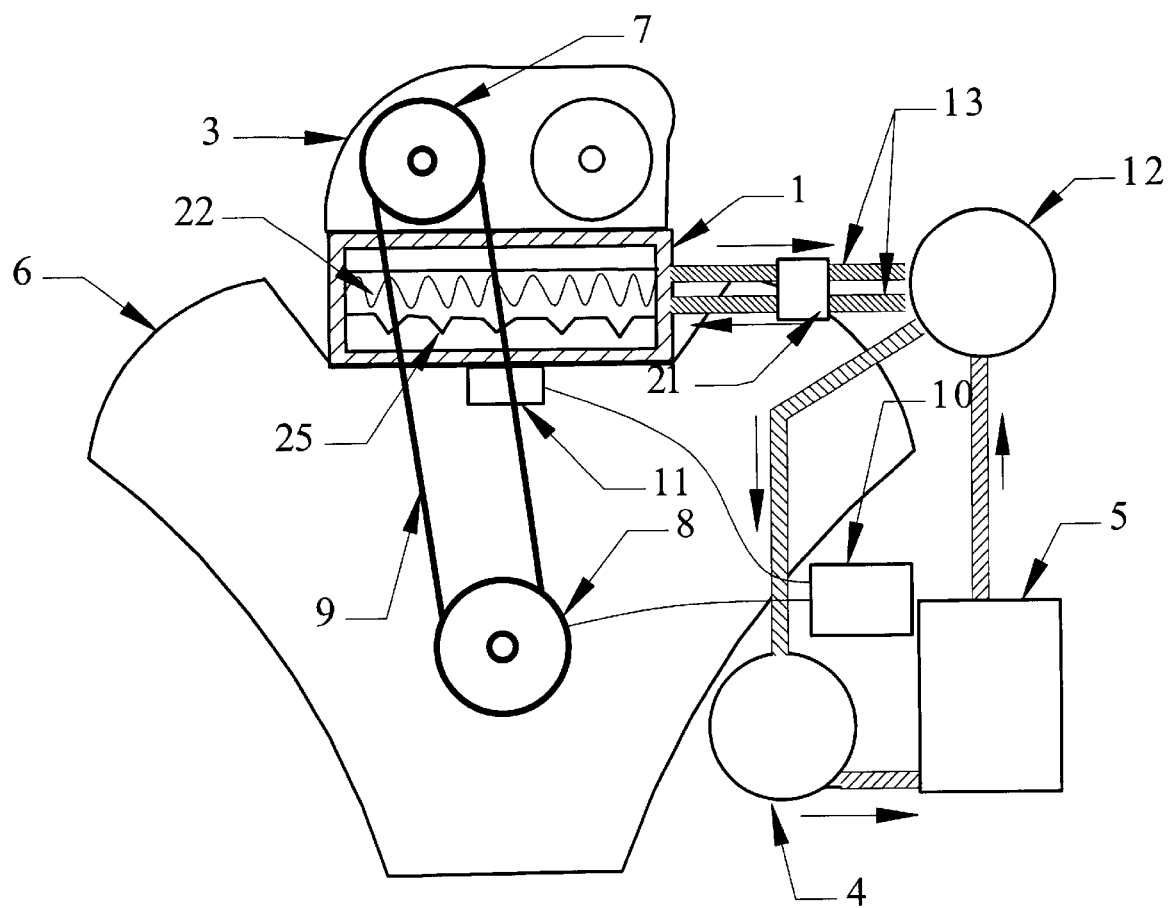
FIG. 2 shows a front elevational view illustrating an embodiment of the intercooler system of the invention which may be used to lower the temperature of the intake air to below freezing (0° C.).

FIG. 2 shows an embodiment of the intercooler system of the invention which may be used to lower the temperature of the intake air to below freezing (0° C.).

Antifreeze is pumped through the intercooler case 1 by a heat exchanger 12 via input and output lines 13. The heat exchanger 12 includes a pump for this purpose. The antifreeze is cooled by compressed refrigerant which is supplied by a closed loop cooling system including the compressor 4 and condenser 5.

The system of the present embodiment is capable of cooling the intake air to below-freezing temperatures by incorporating a very rapid defrost cycle. A defroster valve 21 is used to divert hot antifreeze exiting from the coil 22 back through the coil very briefly to dislodge ice that may have formed on the coil. The ice and any liquid water that has formed are immediately swept into the engine by the flow of air.

In the preferred embodiment, the coil 22 is divided into sections so that only a small part of it is defrosted at a time. Hot anti-freeze is preferably diverted to only lower parts of the coil 22 because ice does not form on the hotter, upper portions of the coil.

Figure 3:
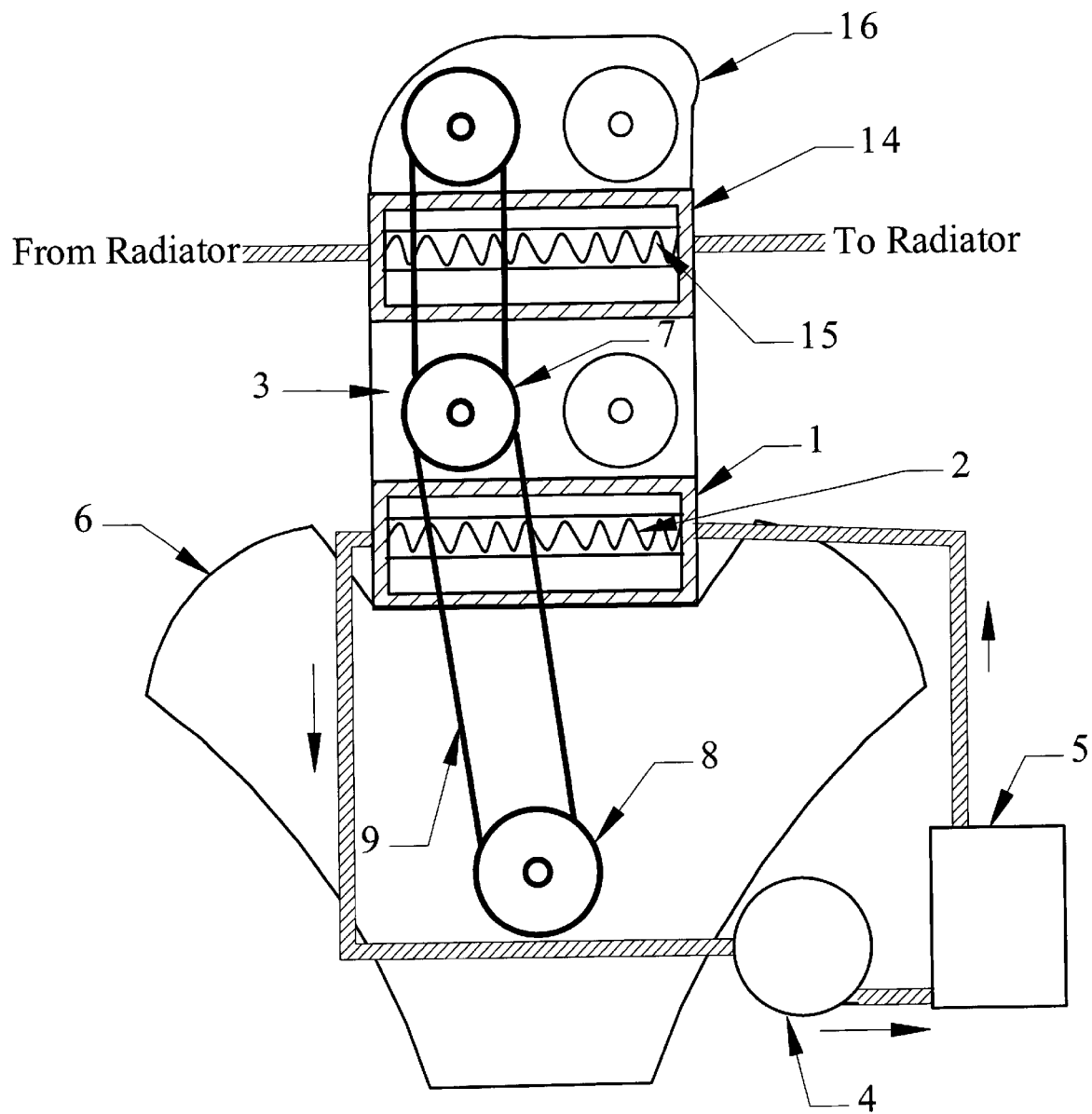
FIG. 3 shows a front elevational view illustrating an embodiment of the invention wherein multiple superchargers are provided in series with an intercooler therebetween.

FIG. 3 shows an embodiment of the invention wherein multiple superchargers 3, 16 are provided in series along with an intercooler 14 (incorporating a coil 15) between two superchargers 3, 16. That intercooler 14 receives air from the output side of the first supercharger 16 and discharges it to the intake side of the second supercharger 3.

While the invention has been particularly shown and described with reference to a preferred embodiment thereof, it will be understood by those skilled in the art that various changes in form and details may be made therein without departing from the spirit and scope of the invention.

What is claimed is:

1. An internal combustion engine having an intercooler system, comprising:
   a first intercooler for receiving and partially cooling intake air;
   a second intercooler comprising at least one refrigeration device, said refrigeration device comprising means for extracting heat from intake air received from said first intercooler prior to intake of said air by said internal combustion engine, whereby said intake air is cooled, said refrigeration device comprising:
   a cooling heat exchange device;
   a heating heat exchange device; and,
   a powered unit capable of pumping heat from a cooler to a hotter region.

2. The apparatus in accordance with claim ,1 wherein said at least one refrigeration device comprises an evaporator coil, a condenser coil, and a pump.

3. The apparatus in accordance with claim 1, further comprising:
   means for using said internal combustion engine to drive a supercharger;
   means for varying a drive ratio between said internal combustion engine and said supercharger.

4. The apparatis in accordance with claim 3, wherein said means for varying the drive ratio comprises a drive pulley associated with said internal combustion engine and a driven pulley associated with said supercharger.

5. The apparatus in accordance with claim 4, wherein at least one of said drive pulley or said driven pulley has a variable radius.

6. The apparatus in accordance with claim 4, wherein each of said drive pulley or said driven pulley has a variable radius.

7. The apparatus in accordance with claim 3, wherein said means for varying said drive ratio is controlled by a sensor.

8. The apparatus in accordance with claim 3, wherein said means or varying said drive ratio is controlled by a knock sensor.

9. The apparatus in accordance wilh claim 3, wherein said means for varying said drive ratio is controlled by an engine management computer so as to operate in a plurality of modes of supercharger operation.

10. The apparatus in accordance with claim 9, wherein said plurality of modes include a performance mode and aii economy mode, said performrance mode being characterized by said supercharger providing a high level of boost relative to a level of boost provided by it in said economy mode.

11. The apparatus in accordance with claim 1, further comprising means for allowing condensation from said evaporator coil to enter said engine.

12. The apparatus in accordance with claim 11, further comprising means for distributing said condensation substantially equally among cylinders of said internal combustion engine, said means for distributing being proximate to said evaporator coil.

13. The apparatus in accordance with claim 12, wherein said means for distributing is pointed.

14. The apparatus in accordance with claim 1, wherein said refrigeration device comprises an evaporator coil.

15. The apparatus in accordance with claim 1, wherein said refrigeration device is interposed between a supercharger and an air intake of said internal combustion engine.

16. The apparatus in accordance with claim 1, wherein said first intercooler utilizes air or water as a cooling medium.

17. An internal combustion engine, comprising:
   at least one machanical refrigeration device, said mechanical refrigeration device receiving compressed coolant and using said coolant to exchange heat from intake air received prior to intake of said air by said internal combustion engine;
   means for using said intenial combustion engine to drive a blower associated with a supercharger;
   means for varying a drive ratio between said internal combustion engine and said supercharger.

18. The apparatus in accordance with claim 17, wherein said means for varying the drive ratio comprises a drive pulley associated with said internal combustion engine and a driven pulley associated with said supercharger.

19. The apparatus in accordance with claim 18, wherein at least one of said drive pulley or said driven pulley has a variable radius.

20. The apparatus in accordance with claim 18, wherein each of said drive pulley or said driven pulley has a variable radius.

21. The apparatus in accordance with claim 17, wherein engagement of said means for varying the drive ratio causes said supercharger to decrease the pressure of air introduced into said air intake.

22. The apparatus in accordance with claim 17, wherein said means for varying the drive ratio comprises means for continuously varying the drive ratio.

23. The apparatus in accordance with claim 17, wherein said means for varying the drive ratio comprises a centrifugal pulley for maintaining a constant supercharger RPM.

* * * * *